United States Patent

Larkin et al.

Patent Number: 5,130,899
Date of Patent: Jul. 14, 1992

[54] TOOL RESTRAINT APPARATUS

[76] Inventors: Kevin D. Larkin, 6991 Glidden St., San Diego, Calif. 92111; Herman Green, 7032 Jamacha Rd., San Diego, Calif. 92114

[21] Appl. No.: 729,181

[22] Filed: Jul. 12, 1991

[51] Int. Cl.⁵ .............................................. F21V 8/00
[52] U.S. Cl. ...................................... 362/32; 362/103; 362/157; 362/398; 24/300; 24/303; 24/306; 224/183; 224/219; 224/222; 224/901
[58] Field of Search .............. 362/32, 103, 119, 157, 362/190, 398; 7/138, 901, 170; 24/3 A, 306, 442, 300, 301, 303; 224/901, 219, 220, 222, 250, 251, 267, 183

[56] References Cited

U.S. PATENT DOCUMENTS

| 774,143 | 11/1904 | Adams | 224/220 |
|---|---|---|---|
| 1,245,817 | 11/1917 | Suserud | 362/103 |
| 1,410,306 | 3/1922 | Hoffman et al. | 24/300 |
| 2,994,300 | 8/1961 | Grahling | 24/300 |
| 4,562,832 | 1/1986 | Wilder et al. | 362/32 |
| 4,728,123 | 3/1988 | Kassal et al. | 224/220 |
| 4,856,149 | 8/1989 | Brame | 24/3 A |
| 4,858,249 | 8/1989 | Stewart | 24/306 |
| 4,862,563 | 9/1989 | Flynn | 24/306 |
| 4,931,913 | 6/1990 | Hwang | 362/103 |
| 4,958,758 | 9/1990 | Tipple et al. | 24/306 |

FOREIGN PATENT DOCUMENTS 580976  8/1959  Canada ............................ 224/183

Primary Examiner—Richard R. Cole
Attorney, Agent, or Firm—Leon Gilden

[57] ABSTRACT

A tool restraint includes an elongate elastomeric tether line, with a respective first and second flexible strap mounted to each end thereof. The first web strap is arranged for selective securement about an individual's wrist, with the second strap for securement about a tool member. A modification of the invention includes magnets mounted within each strap permitting enhanced securement of the tool by the second strap and selective securement to an automotive body part for anchoring the tool preventing its loss.

2 Claims, 4 Drawing Sheets

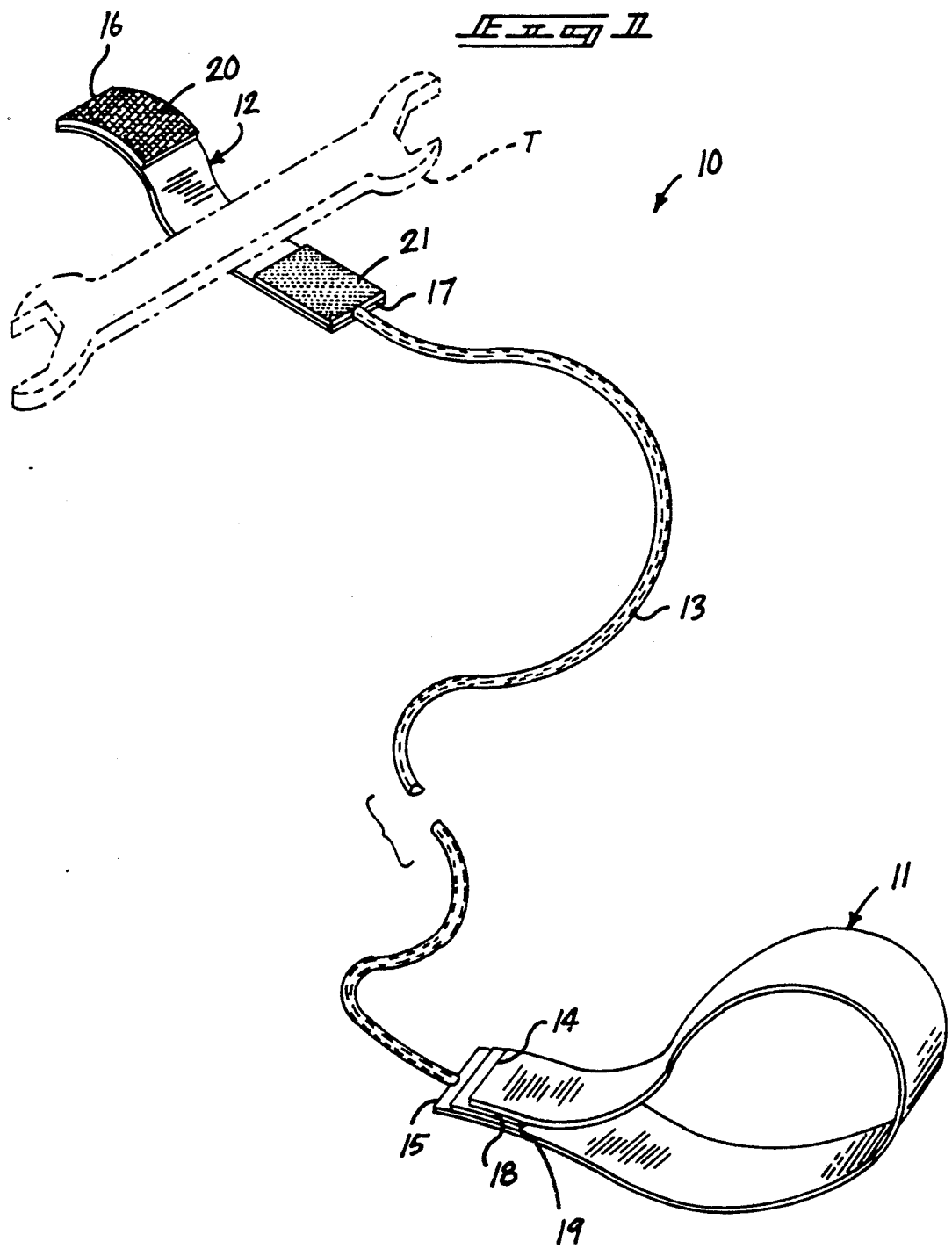

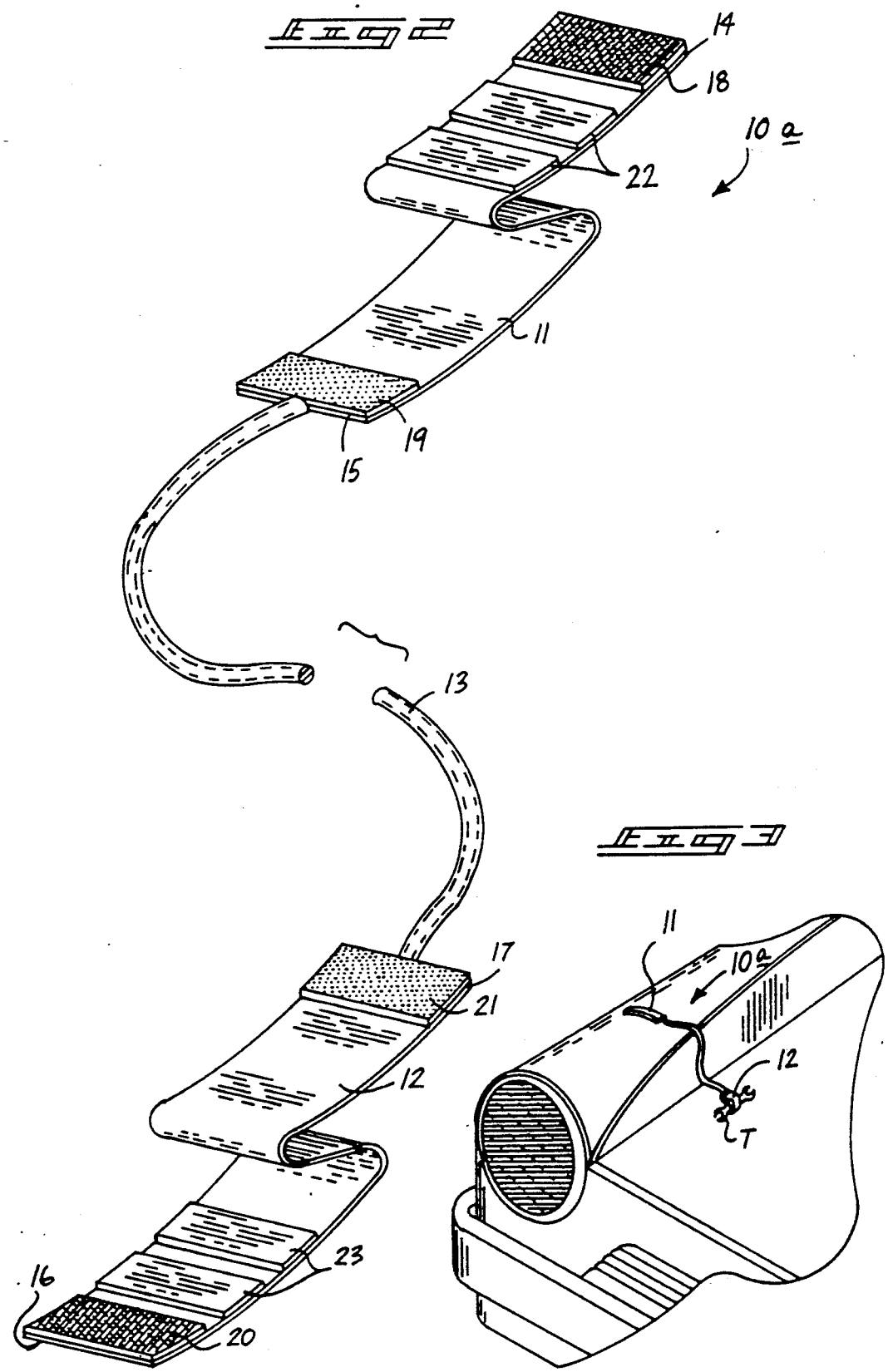

TOOL RESTRAINT APPARATUS

BACKGROUND OF THE INVENTION

1. Field of the Invention

The field of invention relates to tool apparatus, and more particularly pertains to a new and improved tool restraint apparatus wherein the same is arranged for mounting a tether line relative to a tool to prevent its inadvertent loss and misplacement.

2. Description of the Prior Art

The use of tools, particularly in an automotive environment, provides situations where individuals misplace or drop tools through an associated engine compartment or about the vehicle effecting their retrieval cumbersome and awkward. While various elastomeric devices have been utilized in automotive environments, the use of a support structure to secure a tool has heretofore not been provided. For example, U.S. Pat. No. 4,900,204 to Summers sets forth a spider web-shaped cargo restraint device for mounting above a pickup truck bed.

U.S. Pat. No. 2,908,522 to Glave sets forth a trunk lid latch formed of elastomeric straps to secure a trunk lid when positioning devices within a trunk, and such is further exemplified in U.S. Pat. No. 2,919,946 to Miener.

U.S. Pat. No. 4,435,102 to Smith sets forth a tie-down connector for releasably securing an elastomeric cord relative to a bicycle framework for mounting various components thereon.

As such, it may be appreciated that there continues to be a need for a new and improved tool restraint apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of tool apparatus now present in the prior art, the present invention provides a tool restraint apparatus wherein the same utilizes elastomeric cord to anchor a tool member relative to an individual's wrist. As such, the general purpose of the present invention, which will be described subsequently in greater detail, is to provide a new and improved tool restraint apparatus which has all the advantages of the prior art tool apparatus and none of the disadvantages.

To attain this, the present invention provides a tool restraint including an elongate elastomeric tether line, with a respective first and second flexible strap mounted to each end thereof. The first web strap is arranged for selective securement about an individual's wrist, with the second strap for securement about a tool member. A modification of the invention includes magnets mounted within each strap permitting enhanced securement of the tool by the second strap and selective securement to an automotive body part for anchoring the tool preventing its loss.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved tool restraint apparatus which has all the advantages of the prior art tool apparatus and none of the disadvantages.

It is another object of the present invention to provide a new and improved tool restraint apparatus which may be easily and efficiently manufactured and marketed.

It is a further object of the present invention to provide a new and improved tool restraint apparatus which is of a durable and reliable construction.

An even further object of the present invention is to provide a new and improved tool restraint apparatus which is susceptible of a low cost of manufacture with regard to both materials and labor, and which accordingly is then susceptible of low prices of sale to the consuming public, thereby making such tool restraint apparatus economically available to the buying public.

Still yet another object of the present invention is to provide a new and improved tool restraint apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and decriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is an isometric illustration of a modification of the invention.

FIG. 3 is an isometric illustration of the invention mounted relative to an automotive environment.

DESCRIPTION OF THE PREFERRED EMBODIMENT

Figure 4:
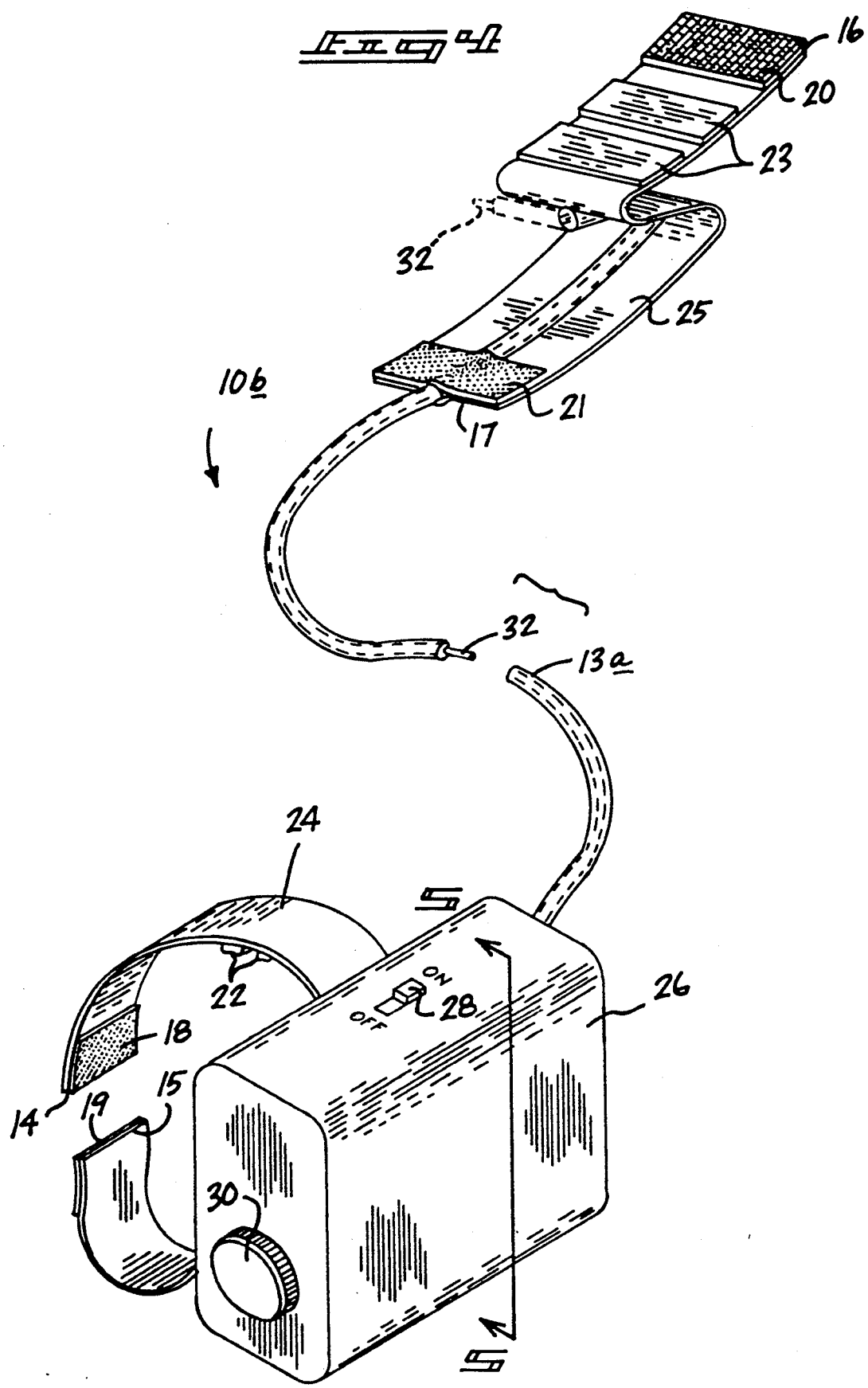
FIG. 4 is an isometric illustration of a further modification of the instant invention.

With reference now to the drawings, and in particular to FIGS. 1 to 6 thereof, a new and improved tool restraint apparatus embodying the principles and concepts of the present invention and generally designated by the reference numerals 10, 10a, and 10b will be described.

More specifically, the tool restraint apparatus 10 of the instant invention essentially comprises a first flexible web strap 11 of a finite length mounted to a second flexible web strap 12, also of a predetermined finite length by way of an elastomeric tether line 13. A tool member "T" is mounted within the second web strap 12, wherein the first web strap is formed in a loop, as illustrated, for securement about a wrist portion of an individual. The first web strap 11 includes a first web first end 14 spaced from a first web second end 15. The second web strap includes a second web first end 16 spaced from a second web second end 17. The respective first web first end and first web second ends 14 and 15 respectively include respective first and second hook and loop fastener patches 18 and 19 mounted to the first web strap adjacent the respective first web first and second ends to permit securement of the first and second hook and loop fastener patches 18 and 19 together for securement about an individual's wrist. The second web strap 12 includes a third hook and loop fastener patch 20 mounted adjacent the second web first end 16, with a fourth hook and loop fastener patch 21 mounted adjacent the second webs second end 17. The third and fourth hook and loop fastener patches 20 and 21 are securable together to secure a tool "T" within the second web strap 12 when the third and fourth hook and loop fastener patches are in engagement relative to one another, in a manner as illustrated in FIG. 3 for example.

The tool restraint apparatus 10a, as illustrated in FIG. 2, utilizes the first and second web straps 11 and 12 in a manner as described above, but further includes a plurality of first bar magnets 22 mounted in the first and second ends 14 and 15 of the first web, with the second strap 12 mounting a plurality of second bar magnets 23 between the first and second ends 16 and 17 of the second web. The first bar magnets 22 permit securement and anchoring of the first web strap relative to a ferromagnetic body surface, as illustrated in FIG. 3, with the second bar magnets 23 enhancing securement of the tool "T" relative to the second strap 12.

Figure 5:
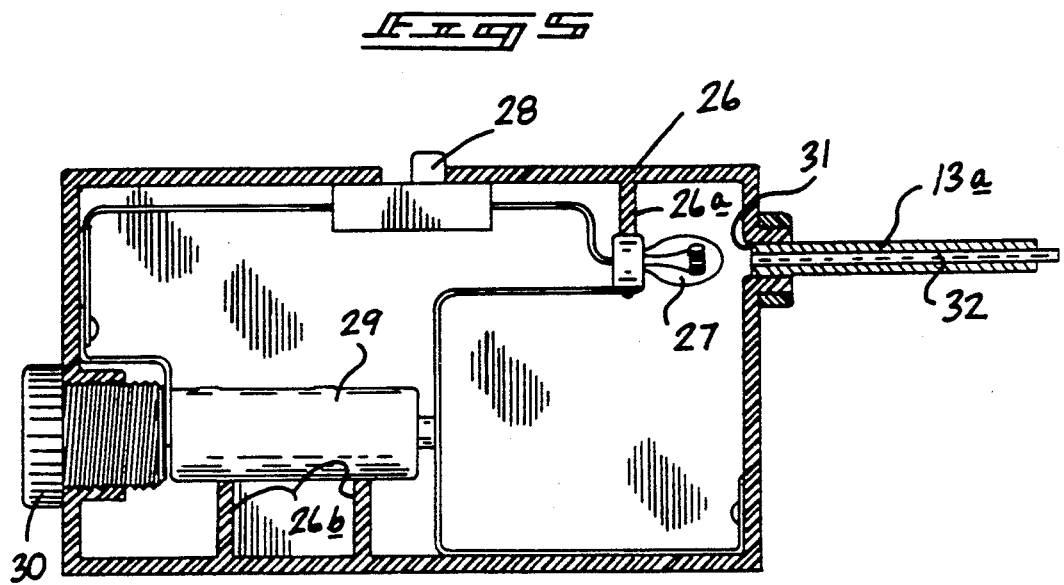
FIG. 5 is an orthographic view, taken along the lines 5-5 of FIG. 4 in the direction indicated by the arrows.
Figure 6:
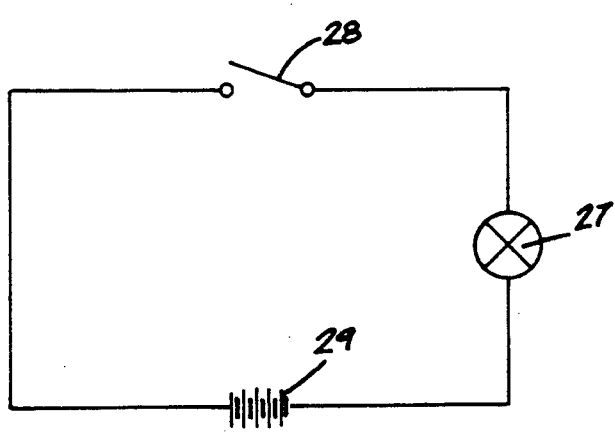
FIG. 6 is a diagrammatic illustration of a typical electrical circuit utilized by the invention.

A further modified tool restraint apparatus 10b, as illustrated in FIGS. 4–6, wherein a modified elastomeric tether line 13a is directed between the first and second modified web straps 24 and 25 respectively. The first and second web straps 24 and 25 are constructed in a manner discussed relative to the apparatus 10a, as illustrated in FIG. 2, but further includes a housing 26 mounted to the first web strap 24. The housing 26 includes an illumination bulb 27 mounted within the housing 26 wihtin a first rigid housing member 26a. A plurality of second rigid housing 26b mount and align a battery 29 relative to a conductive wire member, as illustrated, with a removable plug 30 permitting placement of the battery 29 as required. The first housing web 26a mounts the illumination bulb 27 in coaxial alignment with the housing opening 31, wherein a rear end portion of the modified tether line 13a projects into the housing through the housing opening 31 in alignment with the illumination bulb 27. A fiber optic cable 32 is slidably mounted within the modified tether line 13a alignment with illumination bulb, wherein the tether line directs illumination through the fiber optic cable 32 from the illumination bulb 27, wherein a forward end of the fiber optic cable is directed through the second web strap 25 to position medically of the second web strap to project laterally through a side edge of the second web strap somewhat medially between the first and second ends 16 and 17 of the second web. In this manner, a tool positioned within the web in a medical orientation, as illustrated in FIG. 1, includes a fiber optic cable 32 to further direct illumination to the tool member to provide illumination in use of the tool, as well as provide illuminated positioning of the tool should the tool be inadvertently dropped within an engine compartment of an automotive environment.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A tool restraint apparatus for securement of a tool for tethering the tool relative to an individual's wrist, wherein in the apparatus comprises, a first flexible web strap, the first flexible web strap including a first web first end and a first web second end, and a second flexible web strap, the second flexible web strap including a second web first end and a second web second end, the first web first end includes a first hook and loop fastener patch mounted adjacent thereto, the first web second end includes a second hook and loop fastener patch mounted adjacent thereto, the second web first end includes a third hook and loop fastener patch adjacent the second web first end, and the second web second end includes a fourth hook and loop fastener patch, and an elongate elastomeric tether line, wherein a rear portion of the elastomeric tether line is mounted to the first web strap, and a forward portion of the elastomeric tether line is mounted to the second web strap, and the first and second hook and loop fastener patches are securable together to define the first web strap into a first loop for securement about the individual's wrist, and the third and fourth respective hook and loop fastener patches are securable together to define a second loop for securement about the tool, and wherein the first web strap includes at least one first magnet member mounted fixedly to the first web strap between the first hook and loop fastener patch and the second hook and loop fastener patch, and at least one second magnet member mounted fixedly to the second web strap between the third hook and loop fastener patch and the fourth hook and loop fastener patch, wherein the first magnet member permits securement to a ferrous metallic support surface and the second magnet member permits enhanced securement to the tool, and wherein the first web strap includes a housing member mounted fixedly thereto, the housing member including an illumination bulb contained therewithin, and a battery member mounted within the housing, and an on/off switch mounted slidably relative to the housing, wherein the on/off switch permits selective illumination of the illumination bulb, and a housing opening, and the rear portion of the elastomeric tether line directed through the housing opening in coaxial alignment with the illumination bulb, and a fiber optic cable slidably mounted within the tether line, wherein the fiber optic cable is directed from the housing opening coextensively through the tether line, and the forward portion of the tether line projects longitudinally of and medially of the second web strap, and the fiber optic cable projects laterally of the second web strap for illumination of the tool contained therewithin.

2. An apparatus as set forth in claim 1 wherein the fiber optic cable projects beyond the elastomeric tether line, and the second web strap includes at least a side edge, and the fiber optic cable projects orthogonally relative to the side edge.

* * * * *